United States Patent
Groarke

(10) Patent No.: US 9,934,511 B2
(45) Date of Patent: Apr. 3, 2018

(54) SYSTEM AND METHOD FOR DETERMINING MERCHANT LOCATION AND AVAILABILITY USING TRANSACTION DATA

(75) Inventor: Peter Groarke, Dublin (IE)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 13/538,305

(22) Filed: Jun. 29, 2012

(65) Prior Publication Data

US 2014/0006097 A1    Jan. 2, 2014

(51) Int. Cl.
*G06Q 30/00* (2012.01)
*G06Q 10/00* (2012.01)
*G06Q 30/02* (2012.01)

(52) U.S. Cl.
CPC .................................. *G06Q 30/02* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | |
|---|---|---|---|
| 6,823,188 B1 * | 11/2004 | Stern | G08G 1/0962 455/41.2 |
| 6,862,572 B1 * | 3/2005 | de Sylva | G06Q 30/0205 705/7.34 |
| 7,257,581 B1 | 8/2007 | Steele et al. | |
| 7,356,516 B2 * | 4/2008 | Richey | G06Q 10/087 705/14.51 |
| 7,596,513 B2 * | 9/2009 | Fargo | G06Q 30/00 705/26.62 |
| 7,805,325 B2 * | 9/2010 | Rits | G06Q 10/06 705/7.26 |
| 7,873,708 B2 * | 1/2011 | Durand | G06Q 30/02 709/219 |
| 7,992,002 B2 * | 8/2011 | Bradbury | G06F 21/6245 380/201 |
| 8,025,220 B2 * | 9/2011 | Blume | G06Q 20/04 235/375 |
| 8,032,765 B2 | 10/2011 | Dettinger et al. | |
| 8,037,471 B2 | 10/2011 | Keller et al. | |
| 8,065,353 B2 * | 11/2011 | Eckhoff-Hornback | G06Q 10/087 705/14.65 |

(Continued)

OTHER PUBLICATIONS

Sohn, Timothy, et al. "A diary study of mobile information needs." Proceedings of the SIGCHI Conference on Human Factors in Computing Systems. ACM, 2008.*

(Continued)

*Primary Examiner* — Alan S Miller
(74) *Attorney, Agent, or Firm* — Ohlandt, Greeley, Ruggiero & Perle, L.L.P.

(57) ABSTRACT

A method for determining merchant availability is provided. The method includes storing in an electronic storage device a database of merchant transactions; accessing information in the database concerning the transactions, including time of the transactions and locations for merchants participating in the transactions, and assembling the information to provide locations where a merchant is currently available for conducting business. A computer readable non-transitory storage medium storing instructions of a computer program, which when executed by a computer system, results in performance of steps of the method.

19 Claims, 3 Drawing Sheets

(56) References Cited

U.S. PATENT DOCUMENTS

| | | | | |
|---|---|---|---|---|
| 8,150,737 | B2* | 4/2012 | Lutnick | G06Q 30/02 705/26.1 |
| 8,229,458 | B2* | 7/2012 | Busch | H04W 4/02 370/338 |
| 8,306,846 | B2* | 11/2012 | Tavares | G06Q 30/00 705/7.29 |
| 8,311,944 | B2 | 11/2012 | Knowles et al. | |
| 8,489,511 | B2* | 7/2013 | Coleman | G06F 21/6254 705/51 |
| 8,655,726 | B1* | 2/2014 | Favero | G06Q 30/0205 701/429 |
| 8,688,573 | B1* | 4/2014 | Rukonic | G06Q 40/00 705/39 |
| 8,706,543 | B2* | 4/2014 | Tavares | G06Q 30/00 705/14.41 |
| 2001/0043599 | A1 | 11/2001 | Redmond | |
| 2002/0174031 | A1* | 11/2002 | Weiss | G06Q 20/04 705/26.1 |
| 2003/0061132 | A1* | 3/2003 | Yu, Sr. | G06Q 30/02 705/30 |
| 2003/0163483 | A1 | 8/2003 | Zingher et al. | |
| 2003/0208412 | A1* | 11/2003 | Hillestad | G06Q 40/02 705/26.1 |
| 2004/0139025 | A1* | 7/2004 | Coleman | G06F 21/6254 705/51 |
| 2005/0097005 | A1* | 5/2005 | Fargo | G06Q 30/00 705/26.62 |
| 2007/0130000 | A1* | 6/2007 | Assanassios | G06Q 30/02 705/14.14 |
| 2007/0192229 | A1 | 8/2007 | Rowan | |
| 2008/0004892 | A1* | 1/2008 | Zucker | G06Q 10/0635 705/7.28 |
| 2008/0162258 | A1* | 7/2008 | Kala | G06Q 30/02 705/7.33 |
| 2008/0199053 | A1* | 8/2008 | Zafar | G06Q 30/00 382/115 |
| 2009/0119209 | A1 | 5/2009 | Sorensen et al. | |
| 2009/0171709 | A1* | 7/2009 | Chisholm | G06Q 30/06 705/35 |
| 2009/0287536 | A1 | 11/2009 | Sheng | |
| 2010/0065628 | A1* | 3/2010 | Carmichael | G06K 7/10079 235/382 |
| 2010/0076813 | A1 | 3/2010 | Ghosh et al. | |
| 2010/0257092 | A1* | 10/2010 | Einhorn | G06F 17/30598 705/38 |
| 2010/0324972 | A1* | 12/2010 | Brooke | G06Q 30/02 705/26.3 |
| 2011/0099046 | A1* | 4/2011 | Weiss | G06Q 10/00 705/7.31 |
| 2011/0125393 | A1 | 5/2011 | Williams et al. | |
| 2011/0178848 | A1* | 7/2011 | Rane | G06Q 30/0202 705/7.31 |
| 2011/0231223 | A1* | 9/2011 | Winters | G06Q 20/10 705/7.29 |
| 2011/0276393 | A1* | 11/2011 | Srinivasan | G06Q 30/0247 705/14.46 |
| 2011/0302061 | A1* | 12/2011 | Olives | G06Q 40/02 705/30 |
| 2011/0320256 | A1* | 12/2011 | Florucci | G06Q 30/0226 705/14.33 |
| 2012/0036042 | A1 | 2/2012 | Graylin et al. | |
| 2012/0053987 | A1* | 3/2012 | Satyavolu | G06Q 30/0201 705/7.29 |
| 2012/0084117 | A1* | 4/2012 | Tavares | G06Q 30/0201 705/7.29 |
| 2012/0094639 | A1* | 4/2012 | Carlson | H04W 4/028 455/414.1 |
| 2012/0143720 | A1* | 6/2012 | Moser | G01C 21/362 705/26.8 |
| 2012/0150742 | A1 | 6/2012 | Poon et al. | |
| 2012/0185368 | A1 | 7/2012 | Schloter et al. | |
| 2012/0258735 | A1* | 10/2012 | Monteverde | H04W 4/021 455/456.3 |
| 2012/0302259 | A1* | 11/2012 | Busch | H04W 4/02 455/456.3 |
| 2012/0310702 | A1* | 12/2012 | Paulsen | H04L 63/0815 705/7.29 |
| 2012/0323954 | A1* | 12/2012 | Bonalle | G06F 17/30592 707/769 |
| 2013/0007049 | A1* | 1/2013 | Ziemann | G06T 11/20 707/769 |
| 2013/0024300 | A1* | 1/2013 | Choudhuri | G06Q 40/02 705/16 |
| 2013/0027227 | A1* | 1/2013 | Nordstrom | G08G 1/202 340/990 |
| 2013/0054746 | A1* | 2/2013 | Reimer | G06F 17/30026 709/217 |
| 2013/0124263 | A1* | 5/2013 | Amaro | G06Q 30/02 705/7.34 |
| 2013/0132282 | A1* | 5/2013 | Shakkarwar | G06Q 20/382 705/64 |
| 2013/0137463 | A1* | 5/2013 | Busch | H04W 4/02 455/456.3 |
| 2013/0226731 | A1* | 8/2013 | MacNeille | G06Q 10/00 705/26.8 |
| 2013/0231976 | A1* | 9/2013 | Tavares | G06Q 30/0201 705/7.34 |
| 2013/0238413 | A1* | 9/2013 | Carlson | G06Q 30/0224 705/14.25 |
| 2013/0246124 | A1* | 9/2013 | Fischer | G06Q 30/0204 705/7.33 |
| 2014/0006097 | A1* | 1/2014 | Groarke | G06Q 30/02 705/7.29 |
| 2014/0006107 | A1* | 1/2014 | Groarke | G06Q 30/02 705/7.34 |
| 2014/0108068 | A1* | 4/2014 | Williams | G06Q 10/02 705/5 |
| 2014/0278668 | A1* | 9/2014 | Paradise | G06Q 10/1095 705/7.19 |
| 2015/0025799 | A1* | 1/2015 | Jackson | G01C 21/00 701/519 |
| 2015/0170175 | A1* | 6/2015 | Zhang | G06Q 30/0204 705/7.33 |
| 2015/0220951 | A1* | 8/2015 | Kurapati | G06Q 30/0204 705/7.33 |
| 2016/0063513 | A1* | 3/2016 | Lee | G06Q 30/0201 705/7.29 |

OTHER PUBLICATIONS

"Benefits of Open Payment Systems and the Role of Interchange", MasterCard Worldwide, U.S. Version, 2008, pp. 1-12.

Christian von Weizsäcker, "Economics of Credit Cards—Expert Report on behalf of MasterCard International Incorporated and Europay International SA", Jan. 23, 2002, pp. 1-29.

John Bulmer, "Payment Systems: The Credit Card Market in Canada", Library Bibliothèque of Parliament du Parlement, Sep. 24, 2009, pp. 1-8.

U.S. Appl. No. 13/537,737, filed Jun. 29, 2012.
U.S. Appl. No. 13/538,226, filed Jun. 29, 2012.
U.S. Appl. No. 13/538,270, filed Jun. 29, 2012.
U.S. Appl. No. 13/564,321, filed Aug. 1, 2012.
U.S. Appl. No. 13/564,370, filed Aug. 1, 2012.
U.S. Appl. No. 13/564,398, filed Aug. 1, 2012.
U.S. Appl. No. 13/655,008, filed Oct. 18, 2012.

* cited by examiner

SYSTEM AND METHOD FOR DETERMINING MERCHANT LOCATION AND AVAILABILITY USING TRANSACTION DATA

BACKGROUND OF THE DISCLOSURE

1. Field of the Disclosure

The present disclosure relates to payment card systems. More particularly, it relates to methods for exploiting the information generated by the transactions conducted on such systems.

2. Description of the Related Art

The first credit payment systems were two party systems in which a merchant sold goods to a customer without requiring full or any initial payment, but where the customer paid for the goods at a later date, or may have made periodic payments over a predetermined period of time. This method of payment is of limited scope and is not flexible, in that it involves only one merchant, and the customer must make individual arrangements with each and every merchant, and for each and every transaction.

In a three party system, a single card issuer contracts with customers and issues credit cards to them. The issuer also contracts with merchants, who agree to make sales to a customer having a credit card from the issuer. When a card is presented at a merchant's establishment, it is generally the issuer who approves the transaction and pays the merchant. However, this system, a so-called closed system, has occasionally been modified so that another party approves the transaction and interacts with the merchant.

MasterCard, the assignee of the present application, operates within what is known as a "four-party" payment card system. The four key participants in a four-party system are: (i) the consumer and business cardholders that use the cards; (ii) the merchants that accept the cards; (iii) the financial institutions that issue the cards (referred to as the card issuer); and (iv) the financial institutions that sign up merchants to accept the cards (referred to as the acquirer). In a typical four-party payment card transaction, the merchant pays a "merchant discount fee" (i.e., a merchant service charge) to the acquirer in recognition of the services provided by the acquirer in facilitating payment card acceptance by the merchant. However, a substantial portion of the benefits that the merchant receives through card acceptance comes from the value of the network and services performed by the card issuer. For example, the card issuer underwrites and extends credit to the cardholder of a credit card, which enables the sale, and the card issuer assumes the risk of nonpayment by the cardholder, which enables the merchant to get paid for the transaction even if card issuer does not. To compensate the card issuer for providing such benefits to the acquirer's merchant customer, the acquirer pays an "interchange fee" to the card issuer in connection with a payment card transaction. The interchange fee helps to partially reimburse the card issuer for the many activities it performs and costs it incurs that enable the acquirer to provide significant benefits and value to its merchant customers. Interchange fees are only one of the many cost components of the merchant discount fees that are established by acquirers and paid by merchants in exchange for card acceptance services provided by acquirers to merchants.

In general, the transaction system and associated methods described above work. However there are situations in which additional convenience for the user would be desirable.

SUMMARY OF THE DISCLOSURE

An embodiment of the invention is directed to a method (and a system) for determining merchant availability. The method can be used in a four party payment card processing system or in a three party payment card processing system. The method includes storing in an electronic storage device a database of merchant transactions; accessing information in the database concerning the transactions, including time of the transactions and locations for merchants participating in the transactions, and assembling the information to provide locations where a merchant is currently available for conducting business. The database can contain data concerning transactions in a given geographic region.

The method can further include filtering the data to remove cardholder information related to the transactions. The accessing can comprise using a web site for making the data stored in the database available for users of the web site.

The method further comprising using, in the Internet connected device, at least one of a GPS receiver and a location input screen, for providing location of the Internet connected device. The Internet connected device can be one of a mobile telephone, a computer, a personal digital assistant and a tablet (including an i-Pad), or any device providing similar functions, that can be used to connect to the web site. The method further comprises displaying information concerning merchant establishments that are currently open for business on a display screen of the Internet connected device. The information can be displayed on the screen as a list of merchants currently open for business, and their contact information, or as a real time map indicating location of the merchant establishments that are currently open for business, displayed as markers on the map.

The present disclosure provides, in an exemplary embodiment, that when data in the database indicates that a merchant is no longer open for business, a marker corresponding to the merchant is changed as a warning that the merchant may no longer be open.

In another embodiment of the present disclosure, a computer readable non-transitory storage medium for storing instructions of a computer program, which when executed by a computer system, results in performance of steps of a method for determining merchant availability. The method includes storing in an electronic storage device a database of merchant transactions, accessing information in the database concerning the transactions, including time of the transactions and location for merchants participating in the transactions, and assembling the information to provide locations where a merchant is currently available for conducting business.

BRIEF DESCRIPTION OF THE DRAWINGS

A component or a feature that is common to more than one drawing is indicated with the same reference number in each of the drawings.

DESCRIPTION OF THE PRESENT EMBODIMENT

One problem associated with the use of payment cards is that potential customers interested in a particular product or service, often do not know which merchants are nearby and are open for business. For example a potential customer may be driving at night in an unfamiliar location, and may need to know the location of the nearest gas station (or gas stations) that is currently open, and available to do business.

Reviewing authorization transaction data and merchant location data resulting from transactions provides a powerful indicator that merchants of a certain business type are currently open for business in a given location. Furthermore, non-financial transactions can be used as a sign-on and sign-off indicator of whether the merchant is open or closed.

Figure 1:
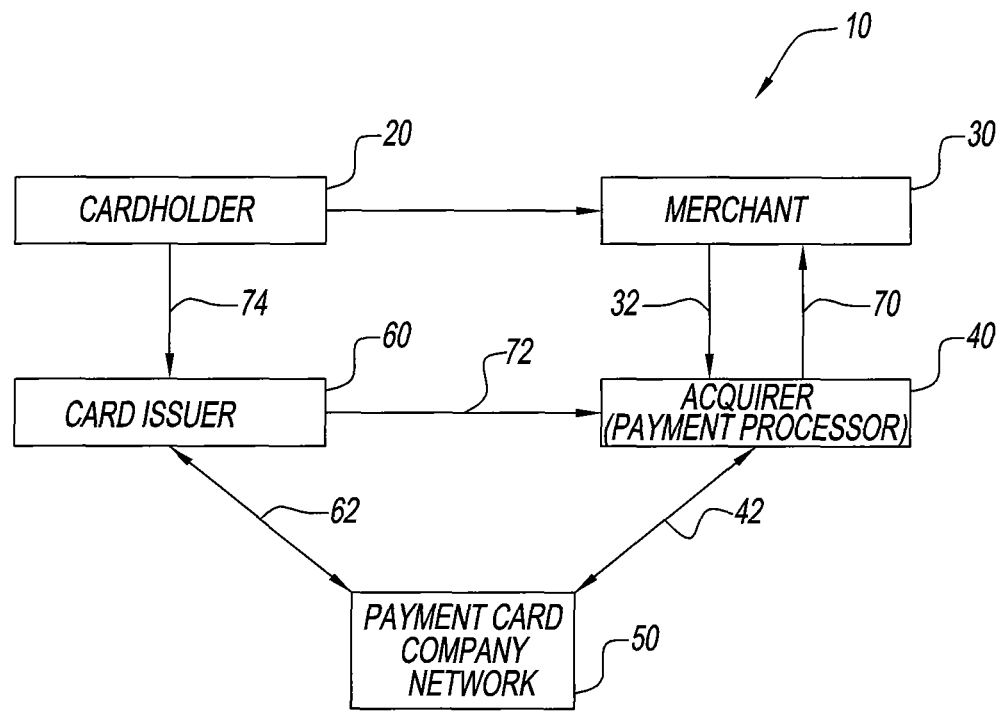
FIG. 1 is a diagram of a four party payment card system.

Referring to the drawings and, in particular, FIG. 1, there is shown a four party system 10. The cardholder 20 submits the payment card to the merchant 30. The merchant's point of sale device (80 in FIG. 2) communicates 32 with his acquiring bank or acquirer 40, which acts as a payment processor. The acquirer 40, at 42, initiates the transaction on the payment card network 50. The payment card network 50 routes the transaction to the issuing bank or card issuer 60, which is identified using information in the transaction message, more fully described below. The card issuer 60 approves or denies an authorization request. At 62, the card issuer 60, then routes, via the payment card network 50 an authorization response back to the acquirer 40. The acquirer 40 sends approval to the POS device of the merchant 30. Seconds later the cardholder completes the purchase and receives a receipt.

The account of the merchant 40 is credited at 70 by the acquirer 40. The card issuer 60 pays the acquirer at 72. Eventually, at 74, the cardholder 20 pays the card issuer 60.

Figure 2:
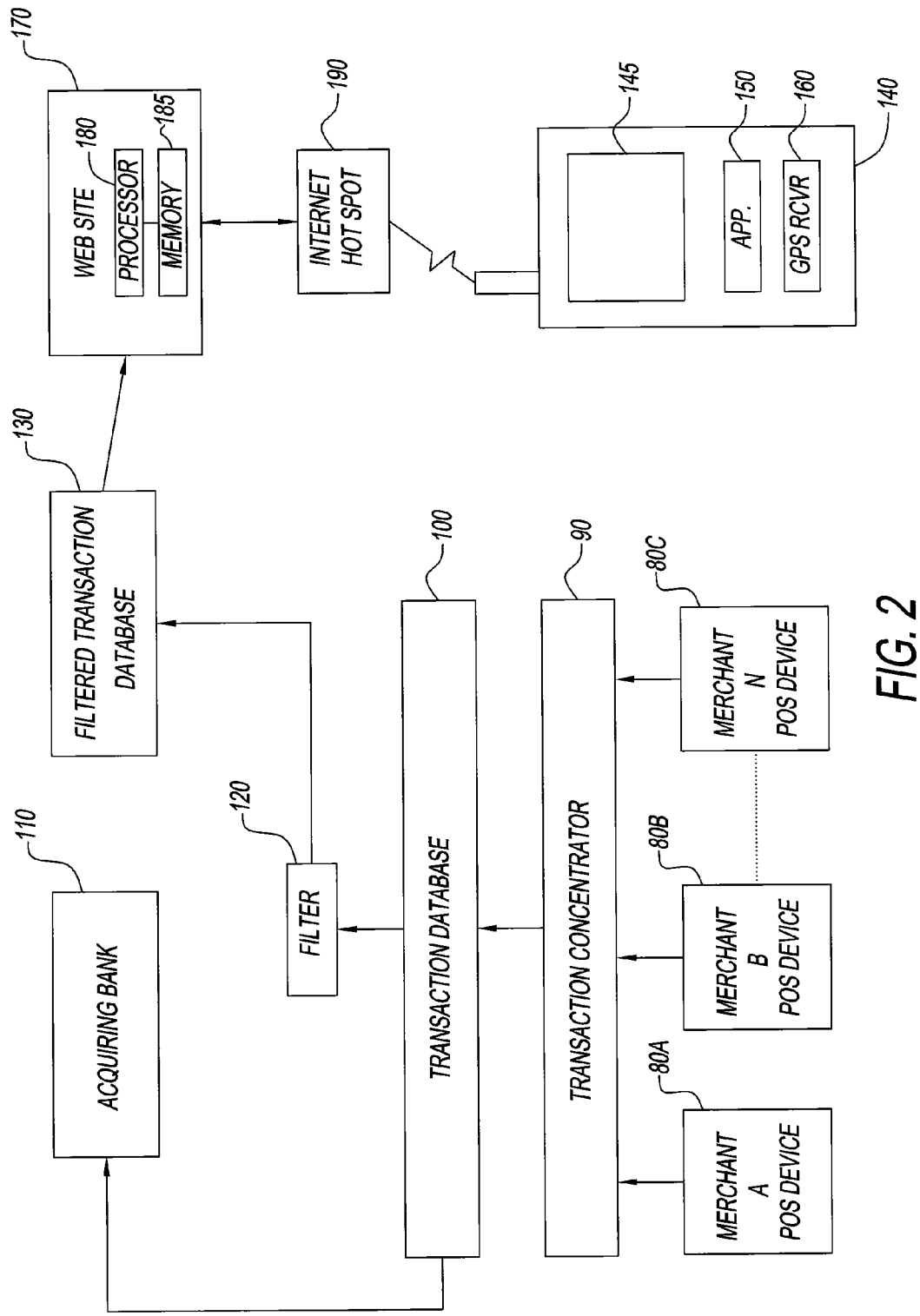
FIG. 2 is a block diagram of a portion of a payment card system modified in accordance with one aspect of the present disclosure.

Referring to FIG. 2, each merchant has on their premises at least one card swiping machine or point of sale device 80, of a type well known in the art, for initiating customer transactions. These point of sale devices 80A, 80B, . . . 80N, generally also have keyboard data entry pads for entering data when a card's magnetic coding becomes difficult to read, or for the purpose of entering card data resulting from telephone calls during which the customer provides card data by telephone. Point of sale devices 80A, 80B, . . . 80N are connected by a suitable network to a transaction concentrator 90, for a given geographic area, which concentrates the transaction information. Each concentrator 90 has associated with it a transaction database 100 that stores information concerning the transaction. Information from the concentrator 90 is routed to a respective acquiring bank 110 that, in turn, routes the information so that transactions are properly completed using the system illustrated in FIG. 1.

While it is advantageous to maintain a local database including transactions in a given geographic area, there is no such limitation on various embodiments of the present disclosure. For example, if the present disclosure is used with a three party system, data for a relatively large geographic region may be stored in a single database at a central location. The time to search this more extensive database, and provide a response to a user, may be slightly greater, but the user will obtain the same useful information.

Information that is exchanged across the network for each credit or debit card financial transaction message includes the following characteristics: acquirer identifier/card accepter identifier (the combination of which uniquely defines the merchant); merchant address (i.e., full address and or GPS data); merchant category code (also known as card acceptor business code), that is an indication of the type of business the merchant is involved in (for example, a gas station); local transaction date and time, cardholder base currency (i.e., U.S. Dollars, Euro, Yen, etc.), the transaction environment or method being used to conduct the transaction (as more fully explained below), product specific data such as SKU line item data, and cost of the transaction.

While merchant address information in the transaction may be incomplete, it can be combined with a database of merchant identifications and precise merchant location information, such as the full address and/or GPS coordinate data for the location of the merchant. When transaction information is aggregated from all merchants and combined with the precise merchant locations, it can be used to answer the question: Where are the merchant locations of a certain business type that are currently open for business? The information can be graphically displayed, as more fully described below.

Transaction records stored in transaction database 100 contain information that is highly confidential and must be maintained as such to prevent fraud and identity theft. The data of the database may be stored in any type of memory, including a hard drive, a flash memory, on a CD, in a RAM, or any other suitable memory.

The transaction records stored in transaction database 100 are sent through a filter 120 (FIG. 3) which removes confidential information, but retains records concerning merchant identification and the occurrence of transactions at various times. The information is preferably available in substantially real time. The filtered data is stored in a filtered transaction database 130 which may be accessed, as described below.

A mobile telephone 140 having a display 145 may have a series of applications or applets thereon including an applet or application program (hereinafter an application) 150 for use with the present method and system described herein. Mobile telephone 140 may also be equipped with a GPS receiver 160 so that its position is always known. Alternatively, if no GPS receiver is provided, application 150 may have provisions for entering the current location of the mobile phone, such as, for example, the name of the town, and the streets forming an intersection where the mobile telephone 140 is located.

Mobile telephone 140 may be used to access a website 170 on the Internet, via an Internet connected Wi-Fi hot spot 190 (or by any telephone network, such as a 3G or 4G system, on which mobile telephone 140 communicates), by using application 150. Website 170 is linked to database 130 so that authorized users of website 170 may have access to the data contained therein. The manner in which that access is exploited, in accordance with the present disclosure, is described with respect to FIG. 4.

Web site 170 has a processor 180 for assembling data from filtered transaction database 130 for responding to user inquiries, as more fully discussed below with respect to FIG. 4. A memory 185 associated with web site 170, having a non-transitory computer readable medium, stores computer readable instructions for use by processor 180 in implementing the operation of the disclosed embodiment.

While the present disclosure is preferably used with a mobile device, because, in general, it may advantageously serve individuals who are away from a home or business location, web site 170 may be accessed from a home or business computer, including a desk top, lap top or notebook computer, from a personal digital assistant, or any other Internet connected device, such as a tablet (for example, a device such as an iPad®). As an example, after working late at the office on a Friday night, an individual may use the present method and system with a desktop office computer, to locate a number of bars that are still open, with the intent of going to one of the bars to have one or more drinks, and to socialize with other patrons who may be there.

Figure 3:
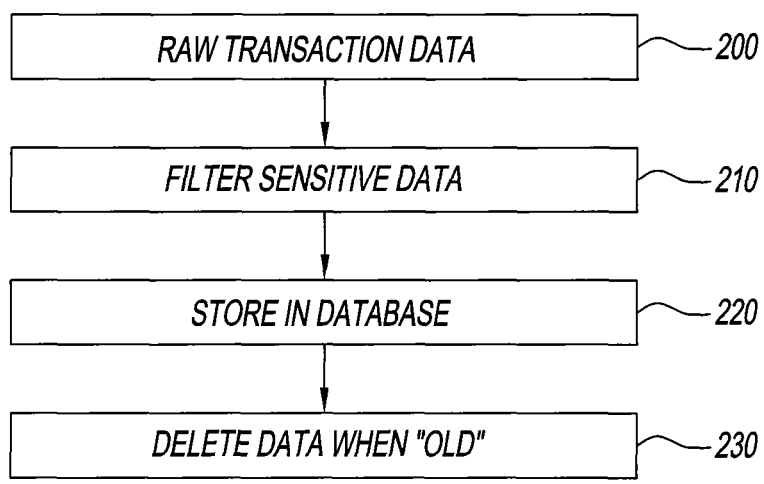
FIG. 3 is a flow chart representing the manner in which acquired data is filtered to preserve confidentiality.

Referring to FIG. 3, the operation of filter 120 (FIG. 2) is illustrated. The raw transaction data usually exchanged over the network is acquired at 200. At 210, customer sensitive information such as the credit card number and expiration date and other customer sensitive information is removed. At 220, the remaining data is stored in database 130 (FIG. 2). At 230, after a relatively short time, data which is no longer current or has become "old" in the context of the present embodiment, can be removed from the database. This serves to conserve space in the memory associated with database 130, and is permissible because, in general, transaction data which is more than, for example, several minutes, or in some cases, several hours old will not be helpful in indicating whether a particular merchant is open for business.

As discussed below, it is also possible to configure the filter so that data associated with off-hour transactions (those that are processed at hours when the merchant is not otherwise open for business) are not passed from transaction database 100 to filtered transaction database 130.

Figure 4:
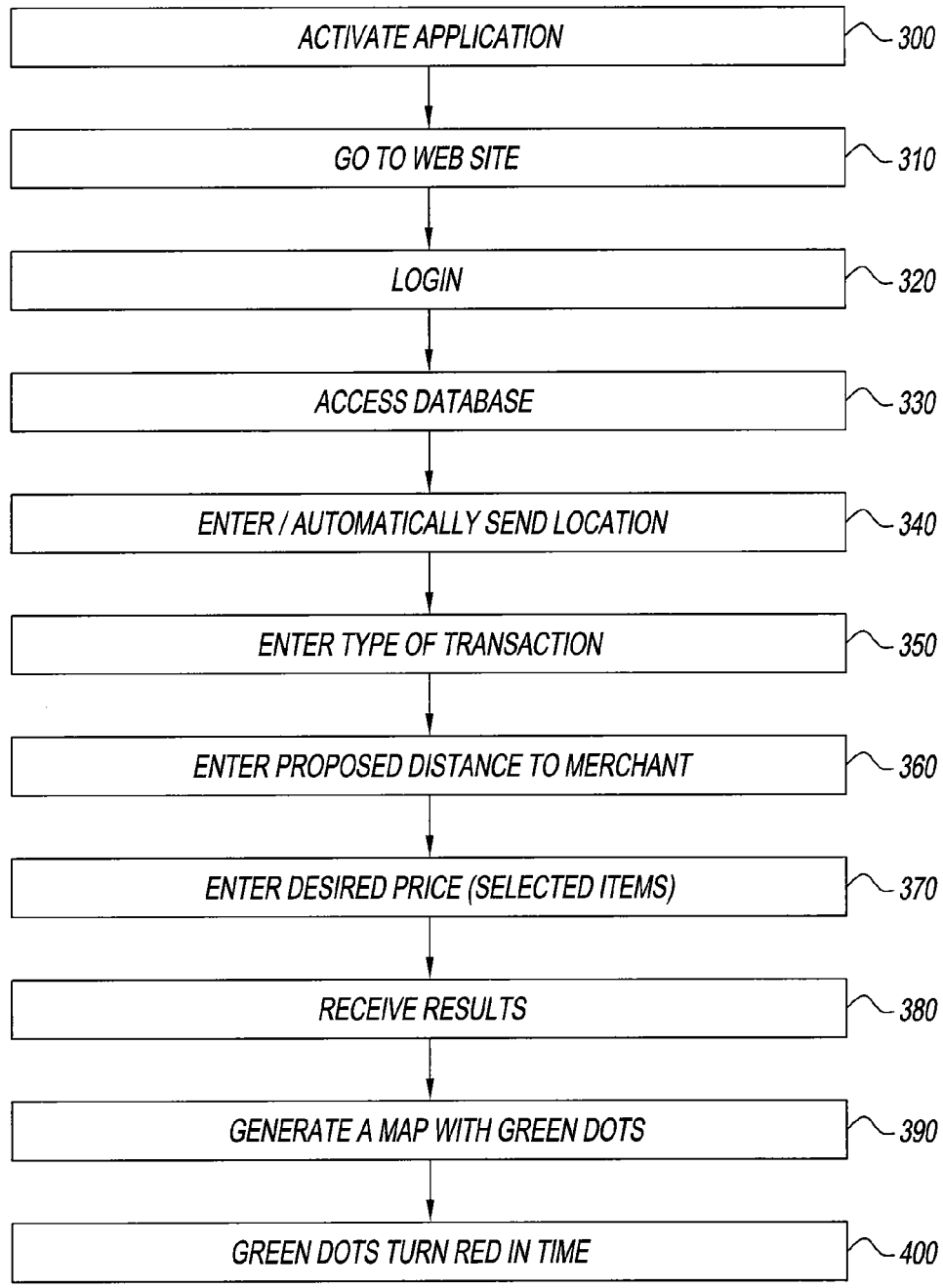
FIG. 4 is a flow chart illustrating the manner in which the system in accordance with the present disclosure is used.

FIG. 4 illustrates the manner in which the present method or system is used by a customer. At 300, the user activates application 150 on mobile telephone 140 (FIG. 2). Assuming that Internet access is available, at 310, optionally, the user will be directed to a log-in page of website 170 (FIG. 2). At 320, the user logs in with a user identification and password in a conventional manner, well known in the art. At 330, access is granted to the information in database 130.

The manner in which the owner of web site 170 exploits the present method and system can vary. The web site may be available free to the public. Alternatively, a user fee may be charged, on a time of use, or periodic basis (such as monthly). Web site 170 may be made available only to card-holders of the type of card being used to make those transactions, or only for free to such cardholders. There are other possibilities for providing access to the web site.

At 340, information which is relevant to the location specified by the coordinates obtained from the GPS receiver 160 in mobile telephone 140 or the entered location information, a predefined default location, or some other method of determining location, whether now know or later developed, is sent from the mobile telephone 140 to the web site 170. At 350, using mobile telephone 140, the user then enters the type of transaction desired. For example, the user may wish to find an eating establishment, a merchant of a particular kind of goods, or an automobile service station. Optionally, at 360 the user may enter the maximum distance that the user desires to travel to arrive at a place where the type of transaction entered at 350 can be conducted. If the user skips this step, a default distance of, for example 3 miles (4.8 kilometers), may be used.

For certain selected items, at 370, the user can enter into mobile telephone 140, using application 150, the maximum price that the user will pay for certain goods or services. At 380, the user will receive the results of a search in database 130 specific to the selected geographic area, for the type of transaction desired, and if price is a criteria, at the specified price, or lower. This may be in the form of a list of establishments for conducting the desired transaction, their addresses and their telephone numbers, shown on display 145 of mobile telephone 140. Alternatively, a map may be generated with, for example, green dots indicating the location of merchants engaging in the type of transaction desired. Application 150 may be configured so that if one of these locations on a map is selected by, for example, using a cursor, the exact name and address for that business establishment is provided. Database 130 may be continuously accessed, and the data updated, at 400, so that if no transactions take place at a given merchant location for a specific period of time, the indicators that are green will change color to red, thus providing the user with a warning that the merchant may have closed, and the desired transaction cannot be completed at that location.

EXAMPLE

A user is in downtown Poughkeepsie, New York at 1 AM looking for a bar open for business. Database 130 shows that there are two merchants in downtown Poughkeepsie of merchant category code bar/restaurant which have authorized transactions in the past five minutes. Application 150 of mobile telephone 140 displays a map with the location of the mobile telephone 140 and the locations of the two nearby bars.

There are other ways in which the system may be made aware of the status of a particular merchant. For example, the system can be configured so that a non-transactional message, such as an account status query service message, or a cardholder balance inquiry, is sent once or twice within a short period of time, such as, for example, within a minute, from the merchant point-of-sale device to indicate that the merchant is opening or closing. Alternatively, or in addition, the point of sale device can be configured to be sensitive to a biological indicator, such as for example, the heartbeat or thumbprint, of the user or users of the point of sale device.

An additional approach can use historical data to determine whether the merchant is open or closed. Earliest and latest authorization data, for previous days or weeks, for that precise location or merchant, may be stored for later access. This may be useful for merchants having low-volume high-priced items where a relatively small number of sales are made in any given period of time.

It will be understood that there are merchants who have conventional brick and mortar stores, but who also accept Internet sales on a twenty four hour a day, seven day a week basis, generally via their own web sites. Merchants may also accept payment card orders by telephone, and may do so at times outside of normal business hours. However, as noted above, a credit or debit card financial transaction message includes data elements that identify the transaction environment or method as, for example, point of sale (POS), with the cardholder in person, mail order or telephone order (MOTO), or e-commerce(ECOM), i.e. online. For purposes of the embodiments described herein, interest is primarily in POS transactions, as the best indicators of when the merchant is open, and available to do business.

It will be understood that while the present disclosure has been described primarily with respect to the four party credit card system, it can also be applied, as noted above, to a three party credit card system. Further, with suitable modifications, as will be understood by one skilled in the art, it can be applied to other kinds of payment card systems, such as debit card charging systems.

While most of the discussion above applies to credit card transactions, generally the same networks that are used to process credit card transactions also can be used to process debit cards and prepaid or preloaded payment cards. Point of sale devices such as those of FIG. 1, as well as gasoline pumps, and other places where a product may be sold, are equipped with input devices, such as push buttons or touch sensitive regions, which are used to indicate whether a payment card is a credit card or a debit card, or in some cases, some other type of payment card. While the legal rules for these different types of payments vary, they are processed in very similar ways at the point of sale.

One significant way in which debit cards depart from credit cards is the processing required to settle a transaction. While transaction concentrators can be used, the acquiring bank receives payment directly from the account of a cardholder, usually at another bank. Generally all of the funds required for the transaction must be on deposit in the account tied to the debit card, before the transaction will be approved. However, some banks have permitted transactions to be conducted involving more funds than are on deposit.

Settlement is similar for prepaid or preloaded cards. An account is established at a financial institution containing a predetermined amount of funds. When the card is presented for payment, funds are withdrawn from the account in an amount sufficient to cover the transaction. Purchases wherein an attempt is made to use more money than is in the account will not be approved.

In all of these cases, the record of transaction contains virtually the same information as discussed above. Thus, the operation of the disclosed embodiment may be essentially identical to what is disclosed with respect to FIG. 2.

It will be understood that the present disclosure may be embodied in a computer readable non-transitory storage medium, storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A system for determining merchant availability, comprising:
    a point of sale device for authorizing a credit, debit, or payment card transaction and generating raw transaction data for the credit, debit, or payment card transaction, the point of sale device being part of a three-party or a four-party payment card transaction processing system;
    an electronic storage device having
        a transaction database, wherein the electronic storage device receives and stores, in the transaction database: (a) merchant data of a merchant conducting the credit, debit, or payment card transaction and (b) the raw transaction data, wherein the raw transaction data includes (i) time and date data, (ii) price data, and (iii) credit, debit, or payment card transaction data including personally identifying confidential information of credit, debit, or payment card users, and the merchant data includes (i) geographical location data of the merchant; and
        a filtered transaction database comprising filtered transaction data;
        an Internet accessible website access interface configured to provide website access to the filtered transaction database; and
    a processor communicatively coupled to the electronic storage device, wherein the processor is configured to:
    filter the raw transaction data to remove personally identifying confidential information of credit, debit, or payment card users, thus yielding the filtered transaction data,
    store the filtered transaction data in the filtered transaction database,
    derive resultant information from both the filtered data and the merchant data based on a request received via the website access interface from an internet connected device of a person, wherein the request includes a time of the request and a maximum distance that the person desires to travel from a present location of the person, and wherein the resultant information is an indication determined from the filtered data of whether a merchant is presently open for business, and
    assemble the resultant information based on the request to provide the person with one or a plurality of locations of the merchant that are presently open for business that met the request.

2. The system of claim 1, wherein the database has data concerning transactions in a given geographic region.

3. The system of claim 1, further comprising: an access path to a web site for making the resultant information available to users of the web site.

4. The system of claim 1, wherein when the resultant information indicates that the merchant is no longer open for business, a marker corresponding to the merchant is changed as a warning that the merchant is no longer open.

5. The system of claim 1, wherein the processor is further configured to assemble the resultant information only within a predetermined period of time of the time of receiving the request.

6. The system of claim 1, wherein the resultant information in the database that is assembled includes only information of merchants that are currently open for business.

7. The system of claim 1, wherein access to the resultant information is available only to card holders of the same type of card being read by the point of sale device.

8. The system of claim 1, wherein the processor is further configured to make the resultant information available to the user device via the website access interface as a map or as a list.

9. The system of claim 8, wherein the processor is further configured to make the resultant information available to the user device via the website access interface including as the map, and wherein the map is generated to show location icons that change color based on whether the merchant is open or closed.

10. A method for determining merchant availability comprising:
    receiving, from a point of sale device that is part of a three-party or a four-party payment card transaction processing system, raw transaction data for an authorized credit, debit, or payment card transaction of a merchant;
    storing, in a transaction database on an electronic storage device, (a) the raw transaction data, wherein the database further comprises (b) merchant data of the merchant, wherein the raw transaction data includes (i) time and date data, (ii) price data, and (iii) credit, debit, or payment card transaction data including personally identifying confidential information of credit, debit, or payment card users, and the merchant data including (i) geographical location data of the merchant;

receiving a request from a user device of a person via an Internet accessible website access interface configured to provide website access to the filtered transaction database, wherein the request is for a merchant that open for business and includes a time of the request and a maximum distance that the person desires to travel from a present location of the person;

filtering, with a processor, the raw transaction data to remove personally identifying information of credit, debit, or payment card users, thus yielding filtered data;

storing the filtered transaction data in a filtered transaction database;

deriving resultant information from both the filtered transaction data and the merchant data based on the request, wherein the resultant information includes an indication determined from the filtered transaction data of whether a merchant is presently open for business;

assembling the resultant information to provide the person with one or a plurality of locations of merchants that are presently open for conducting business that met the request; and making of the resultant information available to the user device via the website access interface.

11. The method of claim 10, wherein the database has information concerning transactions in a given geographic region.

12. The method of claim 10, wherein the making of the resultant information available to a user device comprises using a web site.

13. The method of claim 10, wherein the user device is an internet connected device that is used is at least one selected from the group consisting of: a mobile telephone, a computer, a tablet, and a personal digital assistant.

14. The method of claim 13, further comprising using, in the internet connected device, at least one of a GPS receiver and a location input screen, for providing a location of the Internet connected device.

15. The method of claim 13, further comprising displaying merchants that are currently open for business on a display screen of the Internet connected device.

16. The method of claim 15, wherein the resultant information is displayed on the display screen as a real time map indicating a location the merchant that is currently open for business.

17. The method of claim 16, wherein the merchant currently open for business is displayed on the real time map as marker.

18. The method of claim 17, wherein the resultant information indicates that the merchant is no longer open for business, when the marker corresponding to the merchant is changed as a warning that the merchant is no longer open.

19. A computer readable non-transitory storage medium storing instructions of a computer program which when executed by a computer system results in performance of steps of a method for determining merchant availability comprising:

receiving, from a point of sale device that is part of a three-party or a four-party payment card transaction system, raw transaction data for an authorized credit, debit, or payment card transaction of a merchant;

storing, in a transaction database on an electronic storage device, (a) the raw transaction data, wherein the database comprises (b) merchant data of the merchant, the raw transaction data including (i) time and date data, (ii) price data, and (iii) credit, debit, or payment card transaction data including personally identifying confidential information of credit, debit, or payment card users, and the merchant data including (i) geographical location data of the merchant;

receiving a request from a user device of a person via an Internet accessible website access interface configured to provide website access to the filtered transaction database, the request being for an indication of a merchant that is open for business and including a time of the request and a maximum distance that the person desires to travel from a present location of the person;

filtering, with a processor, the raw transaction data to remove personally identifying information of credit, debit, or payment card users and to remove non-current transaction data, including after hour transaction data, thus yielding filtered transaction data;

storing the filtered transaction data in a filtered transaction database;

deriving resultant information from both the filtered data and the merchant data based on the request;

assembling the resultant information to provide the person with one or a plurality of locations of merchants that are presently open for conducting business that met the request, the resultant information of whether a merchant is presently open for business having been determined from the filtered data; and making the resultant information available to the user device via the website access interface and to card holders of the same type of card being read by the point of sale device.

* * * * *